United States Patent
Hsieh et al.

(10) Patent No.: US 12,258,238 B2
(45) Date of Patent: Mar. 25, 2025

(54) OPTICAL FIBER WINDING MACHINE WITH FULL-TIME TENSION CONTROL FUNCTION

(71) Applicant: AEGIVERSE Co., Ltd., Taoyuan (TW)

(72) Inventors: Ching-Lu Hsieh, New Taipei (TW); Shih-Ju Fan, New Taipel (TW); Hung-Pin Chung, Kaohsiung (TW)

( * ) Notice: Subject to any disclaimer, the term of this patent is extended or adjusted under 35 U.S.C. 154(b) by 239 days.

(21) Appl. No.: 18/151,420

(22) Filed: Jan. 7, 2023

(65) Prior Publication Data
US 2024/0109748 A1    Apr. 4, 2024

(51) Int. Cl.
B65H 59/00 (2006.01)
B65H 59/18 (2006.01)
B65H 59/38 (2006.01)

(52) U.S. Cl.
CPC ........... *B65H 59/18* (2013.01); *B65H 59/385* (2013.01); *B65H 2301/4193* (2013.01); *B65H 2511/21* (2013.01); *B65H 2701/32* (2013.01)

(58) Field of Classification Search
CPC ...... B65H 59/38; B65H 59/18; B65H 59/387; B65H 2701/32; G01C 19/72
See application file for complete search history.

(56) References Cited

U.S. PATENT DOCUMENTS

| | | | |
|---|---|---|---|
| 5,297,748 A * | 3/1994 | LeCompte | B65H 63/00 242/413.5 |
| 11,834,293 B1 * | 12/2023 | Martelli | B65H 54/2812 |
| 2011/0180649 A1 * | 7/2011 | Huang | B65H 23/1955 242/412.1 |
| 2016/0083217 A1 * | 3/2016 | Kotzur | B65H 59/36 242/419 |
| 2021/0090821 A1 * | 3/2021 | Kerling | H01G 13/02 |

FOREIGN PATENT DOCUMENTS

| | | | | | |
|---|---|---|---|---|---|
| AT | 525066 B1 | * | 12/2022 | | B65H 59/38 |
| CN | 102896863 A | * | 1/2013 | | |
| CN | 107902477 A | * | 4/2018 | | B65H 51/22 |
| CN | 208398884 U | * | 1/2019 | | F16C 32/0603 |
| CN | 111532892 A | * | 8/2020 | | B65H 57/00 |
| CN | 111874746 A | * | 11/2020 | | |
| CN | 114524335 A | * | 5/2022 | | |
| KR | 102439943 B1 | * | 9/2022 | | B65H 59/387 |

* cited by examiner

*Primary Examiner* — Emmanuel M Marcelo
(74) *Attorney, Agent, or Firm* — OPES IP Consulting Co., Ltd.

(57) ABSTRACT

An optical fiber winding machine with full-time tension control function is provided. The machine includes a first wire storage ring, a first tension sensing module, a first revolution plate, a first rotary servo motor, a first moving assembly, a plurality of first docking elements, a plurality of first electrical connection modules, a second wire storage ring, a second tension sensing module, a second revolution plate, a second rotary servo motor, a second moving assembly, a plurality of second docking elements, a plurality of second electrical connection modules, a rotating shaft, an optical fiber winding ring, and a control module.

10 Claims, 20 Drawing Sheets

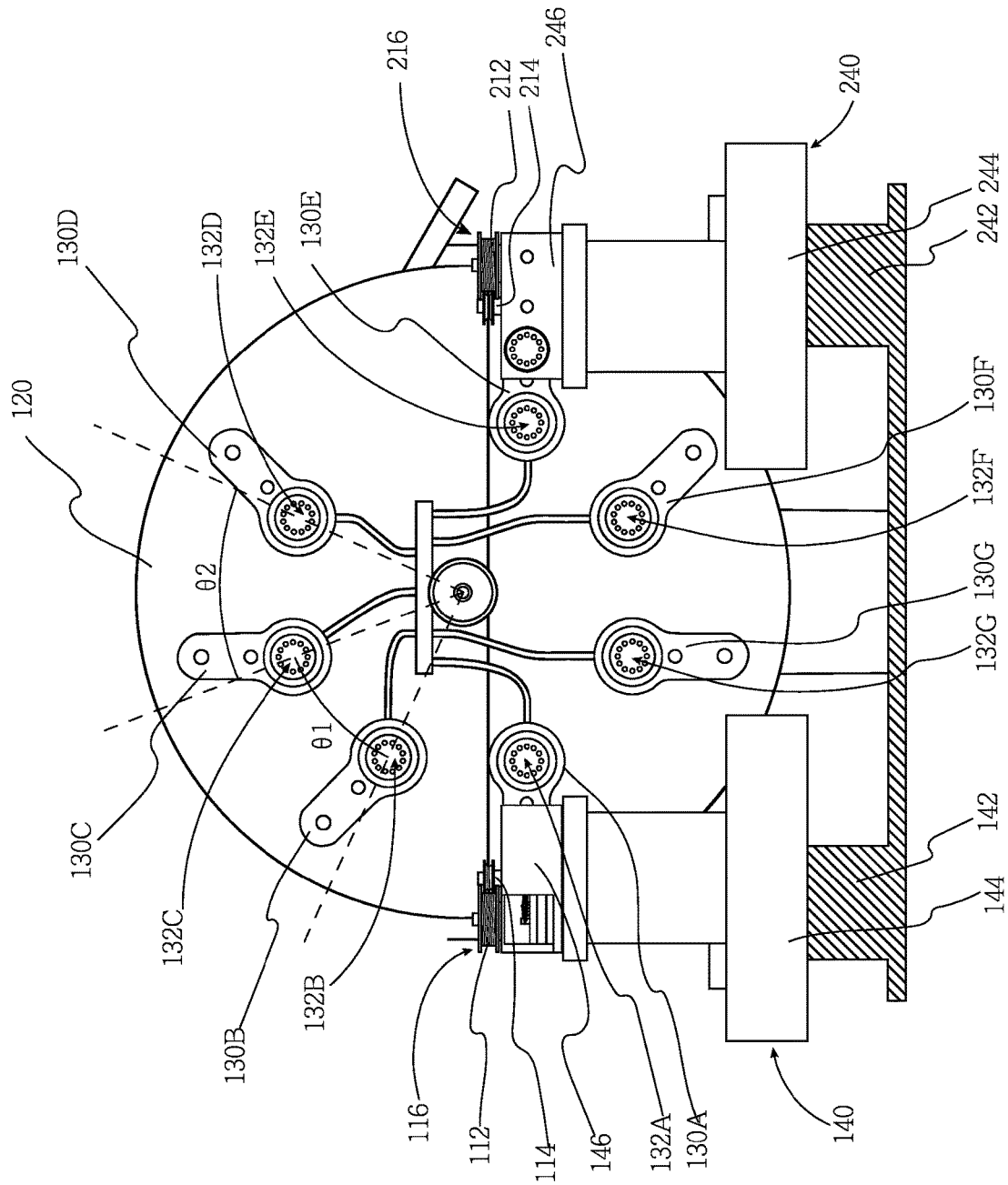

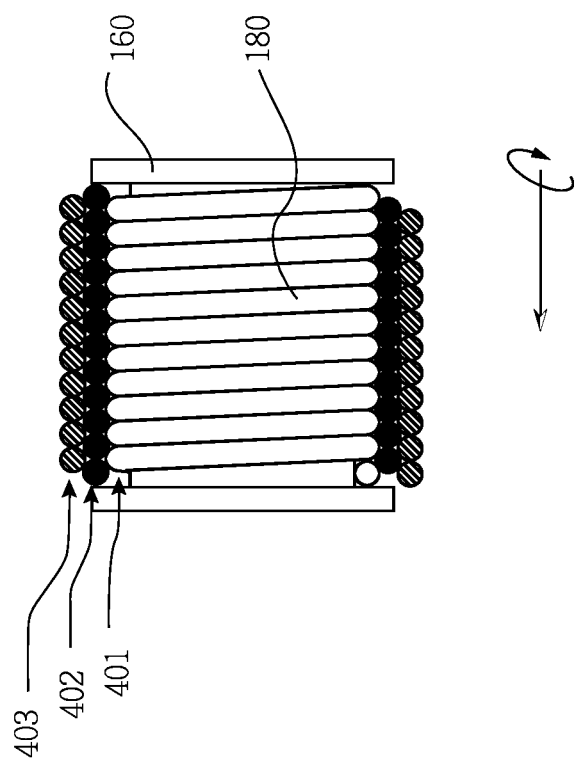
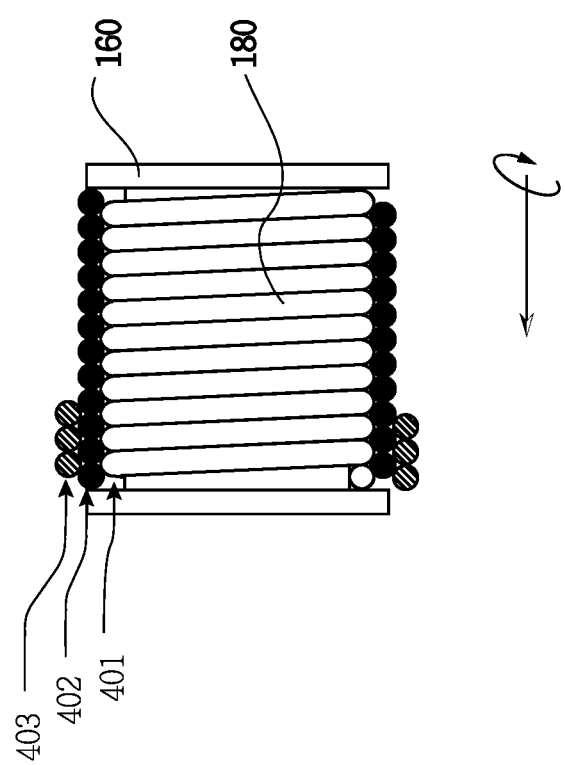

OPTICAL FIBER WINDING MACHINE WITH FULL-TIME TENSION CONTROL FUNCTION

CROSS-REFERENCE TO RELATED APPLICATIONS

This application claims priority of Taiwan Patent Application No. 111137445, filed on Sep. 31, 2022, the entirety of which is incorporated by reference herein.

BACKGROUND OF THE INVENTION

The present disclosure relates to an optical fiber winding machine with full-time tension control function.

An optical fiber gyroscope is a sensing device that uses fiber sensing technology to measure the rate of inertial rotation in space. The optical fiber ring is the sensing element of the optical fiber gyroscope. In general, the optical fiber ring is wound manually or with an optical fiber winding machine. Manually winding the optical fiber ring is time-consuming and labor-intensive, and the quality of each optical fiber rings produced varies.

For the traditional optical fiber winding machine, the tension of the optical fiber cannot be full-time controlled due to the problem of the mechanism. For example, when one of the tension sensing modules senses the tension, the other tension sensing module on the revolution plate cannot receive the signal and cannot sense the tension, which limits the winding process. In addition, the traditional optical fiber winding machine needs to wind the optical fiber at least one turn each time, which may cause the failure to accurately control the interval when the optical fiber is wound, thereby causing problems in product quality.

SUMMARY OF THE INVENTION

An optical fiber winding machine with full-time tension control function is provided. The machine includes a first wire storage ring, a first tension sensing module, a first revolution plate, a first rotary servo motor, a first moving assembly, a plurality of first docking elements, a plurality of first electrical connection modules, a second wire storage ring, a second tension sensing module, a second revolution plate, a second rotary servo motor, a second moving assembly, a plurality of second docking elements, a plurality of second electrical connection modules, a rotating shaft, an optical fiber winding ring, and a control module. A first optical fiber segment of an optical fiber is wound on the first wire storage ring. The first tension sensing module corresponds to the first wire storage ring and is used for detecting a first tension of the first optical fiber segment. The first rotary servo motor is connected to the first revolution plate and includes a first output shaft, wherein the first rotary servo motor is used for driving the first revolution plate to rotate in a first rotational direction. The first moving assembly is connected to the first revolution plate and is operated to move the first wire storage ring. The set of first docking elements are disposed on the first revolution plate. The set of first electrical connection modules are disposed corresponding to the set of first docking elements and the first output shaft. The second wire storage ring is disposed opposite to the first wire storage ring, wherein a second optical fiber segment of the optical fiber is wound on the second wire storage ring, and the first optical fiber segment and the second optical fiber segment are connected to each other. The second tension sensing module corresponds to the second wire storage ring and is used for detecting a second tension of the second optical fiber segment. The second revolution plate is disposed corresponding to the first revolution plate. The second rotary servo motor is connected to the second revolution plate and includes a second output shaft, wherein the first output shaft and the second output shaft are coaxial, and the second rotary servo motor is used for driving the second revolution plate to rotate in the first rotational direction. The second moving assembly is connected to the second revolution plate and is operated to move the second wire storage ring. The set of second docking elements are disposed on the second revolution plate and corresponding to the set of first docking elements. The set of second electrical connection modules are disposed corresponding to the set of second docking elements and the second output shaft. The rotating shaft is connected to the first output shaft and driven by the first rotary servo motor to rotate in the first rotation direction R1. The optical fiber winding ring is sleeved on the rotating shaft and being operative to rotate in the first rotational direction, wherein the first optical fiber segment and the second optical fiber segment are wound on the optical fiber winding ring, and the optical fiber winding ring and the optical fiber wound on the optical fiber winding ring form an optical fiber ring. The control module is electrically connected to the first rotary servo motor, the second rotary servo motor, the first moving assembly, the second moving assembly, the set of first electrical connection modules, and the set of second electrical connection modules and generating a first driving signal, a second driving signal, a first sensing signal, and a second sensing signal for controlling the first rotary servo motor and the second rotary servo motor rotating in the first rotational direction, and controlling the first tension sensing module and the second tension sensing module sensing the first tension and the second tension, respectively. When the first wire storage ring connects to the set of first docking elements and leaves the first moving assembly, the second wire storage ring is positioned at the second moving assembly, the first tension sensing module receives the first sensing signal through the first electrical connection modules, and the second tension sensing module is electrically connected to the control module to receive the second sensing signal. When the second wire storage ring connects to the set of second docking elements and leaves the second moving assembly, the first wire storage ring is positioned at the first moving assembly, the second tension sensing module is electrically connected to the control module to receive the second sensing signal, the first tension sensing module is electrically connected to the control module to receive the first sensing signal, so the first tension sensing module and the second tension sensing module detect the first tension and the second tension full-time when the first revolution plate and the second revolution plate are rotating.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3A is a cross-sectional view illustrated along a section A-A in FIG. 2.

FIG. 12A and FIG. 12B are schematic views viewed in different directions when the optical fiber is wound on the optical fiber winding ring to get the third layer.

DETAILED DESCRIPTION OF THE INVENTION

Figure 1:
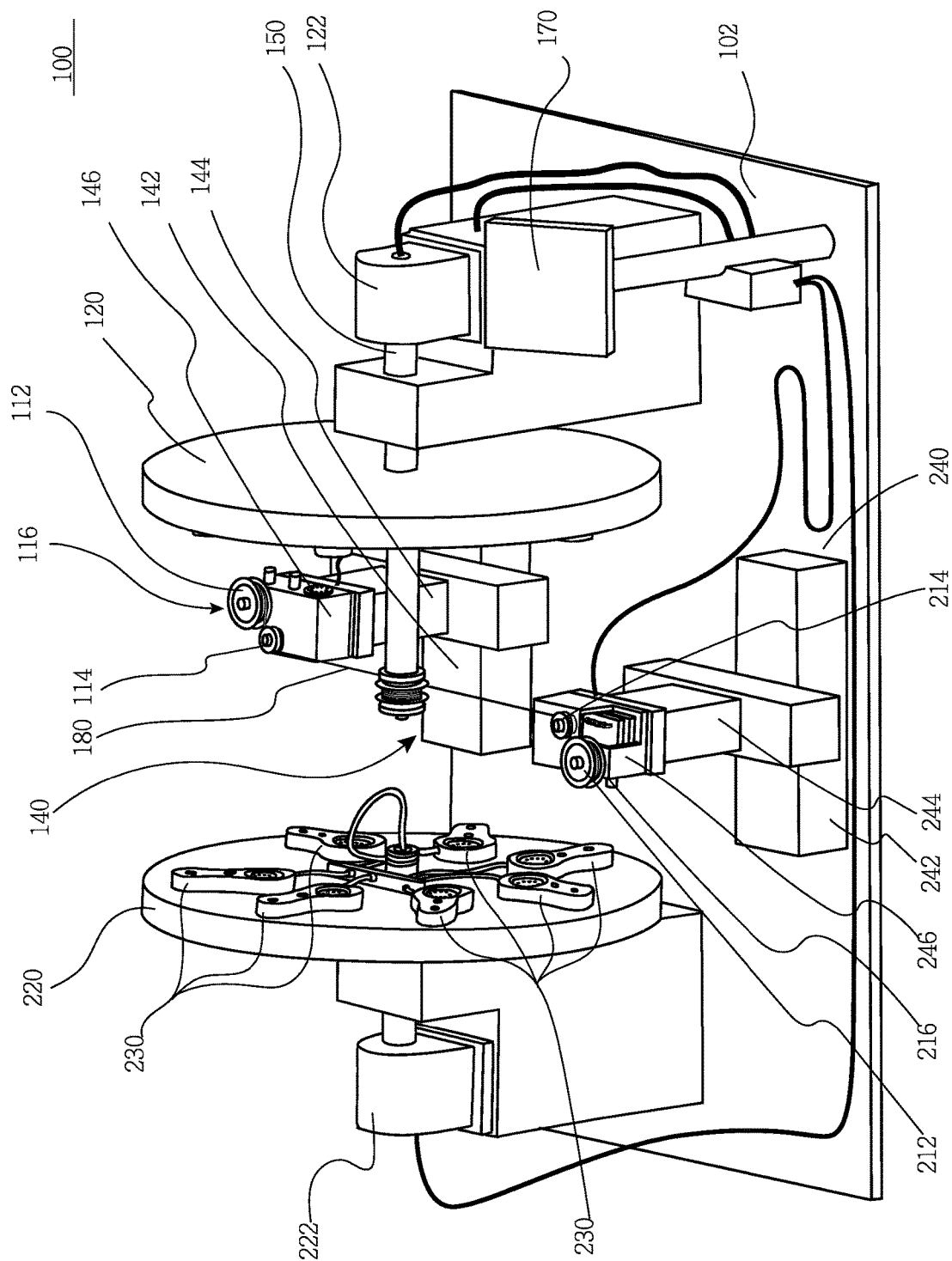
FIG. 1 is a schematic view of an optical fiber winding machine in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected to" or "coupled to" another element, it may be directly connected to or coupled to the other element, or one or more intervening elements may be present.

Figure 2:
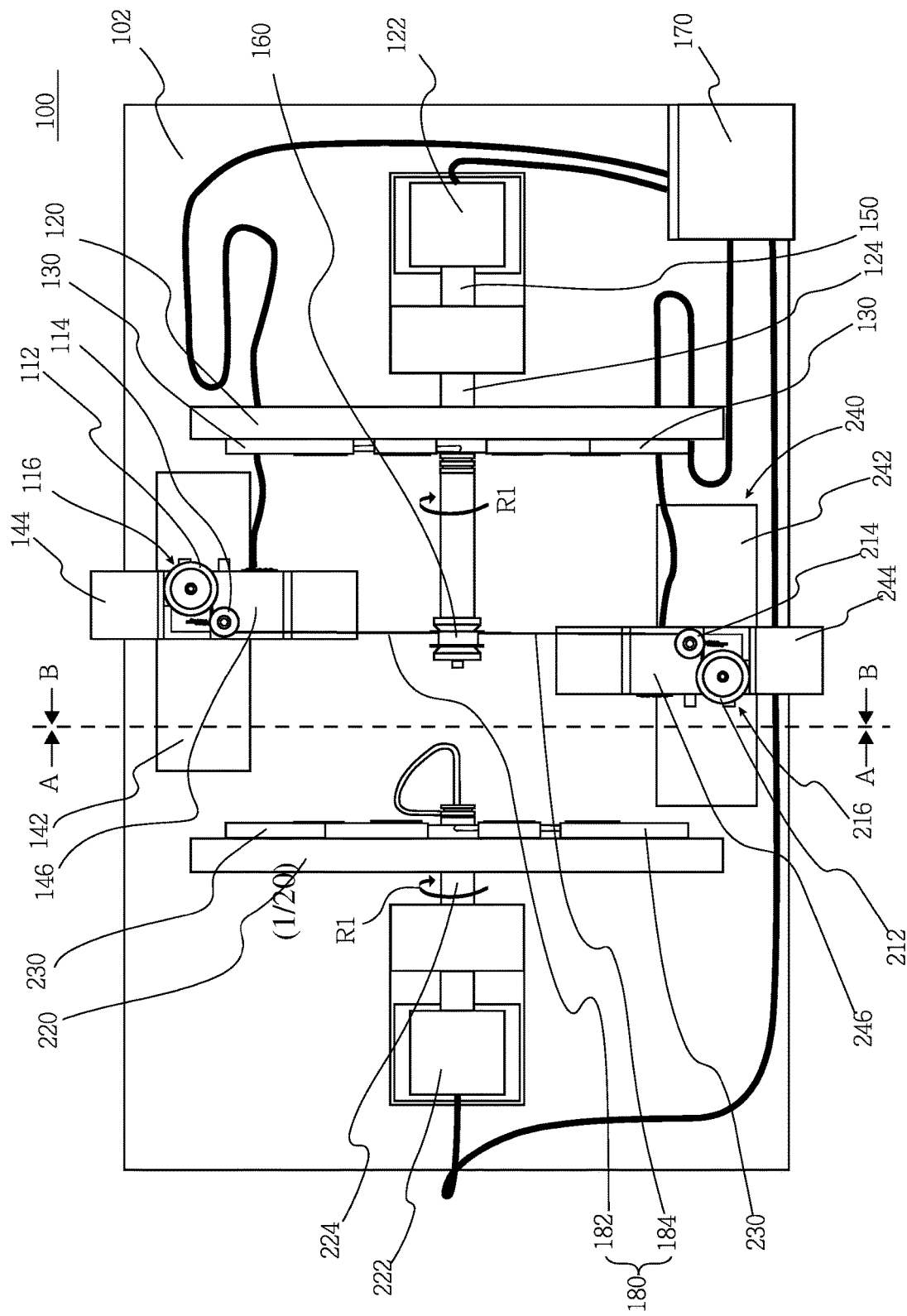
FIG. 2 is a top view of the optical fiber winding machine in some embodiments of the present disclosure.

FIG. 1 is a schematic view of an optical fiber winding machine 100 in some embodiments of the present disclosure. FIG. 2 is a top view of the optical fiber winding machine 100 in some embodiments of the present disclosure. As shown in FIG. 1 and FIG. 2, the optical fiber winding machine 100 may include a first wire storage ring 112, a first tension sensing module 114, a first taking and releasing servo motor 116, a first revolution plate 120, a first rotary servo motor 122, a plurality of first docking elements 130, a first moving assembly 140, a rotating shaft 150, an optical fiber winding ring 160, a control module 170, a second wire storage ring 212, a second tension sensing module 214, a second taking and releasing servo motor 216, a revolution plate 220, a second rotary servo motor 222, a plurality of second docking elements 230, and a second moving assembly 240.

In some embodiments, a first optical fiber segment 182 of the optical fiber 180 may be wound on the first wire storage ring 112, a second optical fiber segment 184 of the optical fiber 180 may be wound on the second wire storage ring 212, and the first optical fiber segment 182 may connect to the second optical fiber segment 184 to form the optical fiber 180. In other words, each of the first optical fiber segment 182 and the second optical fiber segment 184 may be a portion of the optical fiber 180. In some embodiments, the first tension sensing module 114 and the second tension sensing module 214 are disposed corresponding to the first wire storage ring 112 and the first tension sensing module 114, respectively. For example, the first tension sensing module 114 and the second tension sensing module 214 may be disposed on an identical moving assembly to detect a first tension of the first optical fiber segment 182 and a second tension of the second optical fiber segment 184, respectively.

In some embodiments, the control module 170 may be electrically connected to the first tension sensing module 114 and the second tension sensing module 214 to provide power and first control signal (or first sensing signal) to the first tension sensing module 114, and provide power and second control signal (or second sensing signal) to the second tension sensing module 214, so the first tension sensing module 114 and the second tension sensing module 214 may be controlled.

In some embodiments, the first wire storage ring 112 and the first tension sensing module 114 may be disposed on the first moving assembly 140, and the first moving assembly 140 is operative to move the first wire storage ring 112 and the first tension sensing module 114. The second wire storage ring 212 and the second tension sensing module 214 may be disposed on the second moving assembly 240, and the second moving assembly 240 is operative to move the second wire storage ring 212 and the second tension sensing module 214.

In some embodiments, the first moving assembly 140 and the second moving assembly 240 may be disposed on a substrate 102, and the first moving assembly 140 may include a first fixed portion 142, a first translational moving portion 144, and a first movable portion 146. For example, ball, slide rail, rack and pinion, and other guide mechanisms may be provided between the first fixed portion 142 and the first translational moving portion 144 to allow the first fixed portion 142 and the first translational moving portion 144 moving in a specific direction back and forth. The first movable portion 146 is detachably disposed on the first translational moving portion 144 to move together with the first translational moving portion 144. In some embodiments, the first wire storage ring 112, the first tension sensing module 114, and the first taking and releasing servo motor 116 may be disposed on the first movable portion 146 and corresponding with each other to move together with the first movable portion 146.

In some embodiments, the second moving assembly 240 may include a second fixed portion 242, a second translational movement portion 244, and a second movable portion 246. For example, ball, slide rail, rack and pinion, and other guide mechanisms may be provided between the second fixed portion 242 and the second translational movement portion 244 to allow the second fixed portion 242 and the second translational movement portion 244 moving in a specific direction back and forth. The second movable portion 246 is detachably disposed on the second translational movement portion 244 to move together with the second translational movement portion 244. In some embodiments, the second wire storage ring 212, the second tension sensing module 214, and the second taking and releasing servo motor 216 may be disposed on the second movable portion 246 and corresponding with each other to move together with the second movable portion 246.

Figure 3B:
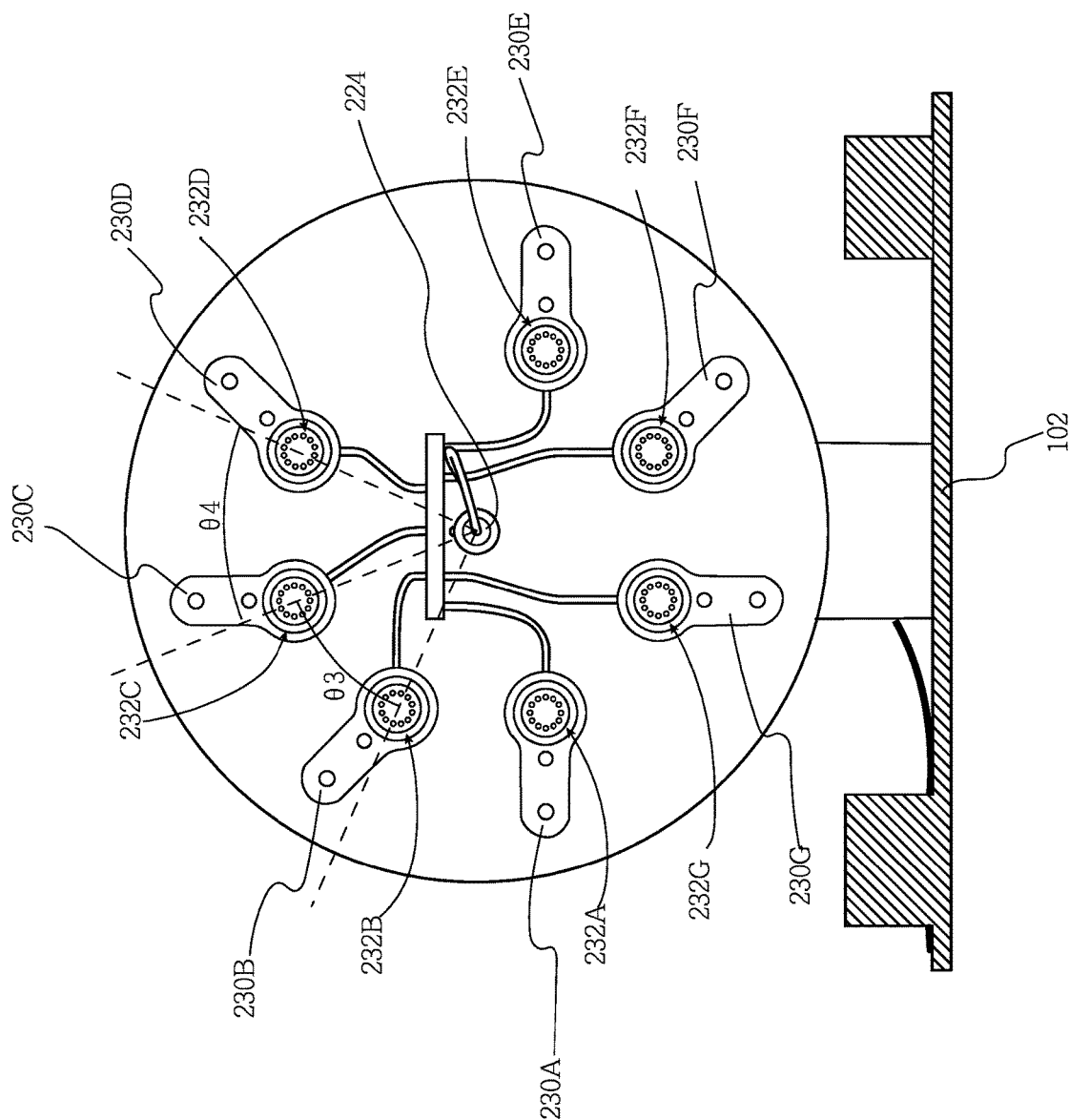
FIG. 3B is a cross-sectional view illustrated along a section B-B in FIG. 2.

FIG. 3A is a cross-sectional view illustrated along a section A-A in FIG. 2. FIG. 3B is a cross-sectional view illustrated along a section B-B in FIG. 2. As shown in FIG. 3A and FIG. 3B, a set of first docking elements 130 and a set of second docking elements 230 are disposed on the first revolution plate 120 and the revolution plate 220, respectively. A set of first docking elements 130 may include one first docking element 130 or a plurality of first docking elements 130, such as a first docking element 130A, a first docking element 130B, a first docking element 130C, a first docking element 130D, a first docking element 130E, a first docking element 130F, and a first docking element 130G shown in FIG. 3A. A set of second docking elements 230 may include one second docking element 230 or a plurality of second docking elements 230, such as a second docking element 230A, a second docking element 230B, a second docking element 230C, a second docking element 230D, a second docking element 230E, a second docking element 230F, and a second docking element 230G shown in FIG. 3B.

By disposing the plurality of first docking elements 130 and second docking elements 230, the optical fiber 180 is allowed to be wound on the optical fiber winding ring 160 with different angles between the starting point and the ending point, so the optical fiber 180 is not necessary to wind for one turn (360 degrees) every time. Moreover, since the optical fiber 180 is not necessary to wind for at least one turn, the remaining space between the optical fiber 180 and the optical fiber winding ring 160 may not be too large, which results next level of the optical fiber 180 falling into the space. It also prevents the remaining space between the optical fiber 180 and the optical fiber winding ring 160 becoming too small, which causes the optical fiber 180 to break due to excessive winding, or the problem that the height of the next layer (such as the first layer of the optical fiber 180) is too high and affects the layer after the next layer (such as the second layer of the optical fiber 180).

For example, in some embodiments of the present disclosure, a set of the first docking elements 130 may include 7 first docking elements 130, and a set of the second docking elements 230 may include 7 second docking elements 230. Therefore, the minimum winding angle of the optical fiber 180 may be reduced from 360 degrees (one turn) to a smaller angle, and the winding is ended until the space between the optical fiber 180 and the optical fiber winding ring 160 is less than the diameter of one optical fiber 180 to solve the problem.

In some embodiments, the angles of the docking elements may be identical (equally disposed) or may be different. For example, as shown in FIG. 3A, an angle θ1 may be defined by the first docking element 130B, the center of the first revolution plate 120, and the first docking element 130C, an angle θ2 may be defined by the first docking element 130C, the center of the first revolution plate 120, and the first docking element 130D, and the angle θ1 and the angle θ2 may be identical or different. Similarly, as shown in FIG. 3B, an angle θ3 may be defined by the second docking element 230B, the center of the revolution plate 220, and the second docking element 230C, an angle θ4 may be defined by the second docking element 230C, the center of the revolution plate 220, and the second docking element 230D, and the angle θ3 and the angle θ4 may be identical or different. Therefore, different lengths (turns) of the optical fiber 180 may be wound on the optical fiber winding ring 160.

For example, after winding a specified number of integral turns, a space may be between the second optical fiber segment 184 and the edge of the optical fiber winding ring 160. The first revolution plate 120 and the revolution plate 220 then may continue to rotate to further wind the second optical fiber segment 184 on the optical fiber winding ring 160. After the first revolution plate 120 and the revolution plate 220 further rotating for a specific angle (e.g. the angle θ1) and no space is between the second optical fiber segment 184 and the edge of the optical fiber winding ring 160, the first revolution plate 120 and the revolution plate 220 will stop rotating. At this moment, the second wire storage ring 212, the second taking and releasing servo motor 216, and the second tension sensing module 214 on the second movable portion 246 may correspond to the second docking element 230B, so the second wire storage ring 212, the second taking and releasing servo motor 216, and the second tension sensing module 214 on the second movable portion 246 may be docked to the second docking element 230B. The winding of next layer may start after the first wire storage ring 112, the first taking and releasing servo motor 116, and the first tension sensing module 114 on the first movable portion 146 are moved back to the first moving assembly 140. There are many ways to move the first wire storage ring 112, the first taking and releasing servo motor 116, and the first tension sensing module 114 on the first movable portion 146 back to the first moving assembly 140, such as simply moving the first moving assembly 140, or may move the first moving assembly 140 and rotate the first revolution plate 120 and the revolution plate 220, but it is not limited thereto.

In some embodiments, the docking elements may correspond to the electrical connection modules. For example, the first docking elements 130 (e.g. the first docking element 130A, the first docking element 130B, the first docking element 130C, the first docking element 130D, the first docking element 130E, the first docking element 130F, and the first docking element 130G) may correspond to the first electrical connection modules 132 (e.g. a first electrical connection module 132A, a first electrical connection module 1326, a first electrical connection module 132C, a first electrical connection module 132D, a first electrical connection module 132E, a first electrical connection module 132F, and a first electrical connection module 132G), and the second docking elements 230 (e.g. the second docking element 230A, the second docking element 230B, the second docking element 230C, the second docking element 230D, the second docking element 230E, the second docking element 230F, and the second docking element 230G) may correspond to the second electrical connection modules 232 (e.g. a second electrical connection module 232A, a second electrical connection module 232B, a second electrical connection module 232C, a second electrical connection module 232D, a second electrical connection module 232E, a second electrical connection module 232F, and a second electrical connection module 232G). For example, when a set of the first docking elements 130 has one first docking element 130, the number of the first electrical connection module 132 may be one, and when the set of the first docking elements 130 has more than one first docking elements 130, the number of the first electrical connection module 132 (e.g. including the first electrical connection module 132A, the first electrical connection module 132B, the first electrical connection module 132C, the first electrical connection module 132D, the first electrical connection module 132E, the first electrical connection module 132F, and the first electrical connection module 132G) may correspond to the number of the first docking elements 130 to allow the first docking elements 130 providing power to the first tension sensing module 114 and the first taking and releasing servo motor 116 through the first electrical connection module 132. The numbers of the second docking element 230 and the second electrical connection module 232 (e.g. the second electrical connection module 232A, the second electrical connection module 232B, the second electrical connection module 232C, the second electrical connection module 232D, the second electrical connection module 232E, the second electrical connection module 232F, and the second electrical connection module 232G) may have similar relationship, and it is not repeated. When the number of the docking element is one, the optical fiber winding machine in some embodiments of the present disclosure still can solve the problem that the traditional optical fiber winding machine cannot perform full-time tension sensing.

Referring back to FIG. 1 and FIG. 2. In some embodiments, the control module 170 may provide a first driving signal to the first rotary servo motor 122, and the first rotary servo motor 122 is connected to the first revolution plate 120 and has a first output shaft 124 to drive the first revolution plate 120 rotating in a first rotation direction R1 according to the first driving signal. Moreover, the control module 170 may provide a second driving signal to the second rotary servo motor 222, and the second rotary servo motor 222 is connected to the revolution plate 220 and has a second output shaft 224 to drive the revolution plate 220 rotating in the first rotation direction R1 according to the second driving signal. In some embodiments, the first rotation direction R1 may be clockwise direction or counterclockwise direction when viewed from the first revolution plate 120 to the revolution plate 220 depending on design requirement, and it is not limited thereto.

In some embodiments, the rotating shaft 150 may connect to the first rotary servo motor 122 and may be driven by the first rotary servo motor 122 to rotate in the first rotation direction R1. The optical fiber winding ring 160 may be sleeved on the rotating shaft 150 and rotated by the rotating shaft 150 in the first rotation direction R1. Therefore, the first optical fiber segment 182 and the second optical fiber segment 184 may be wound on the optical fiber winding ring 160 to form the optical fiber ring by the optical fiber winding ring 160 with the wound optical fiber 180.

Figure 4:
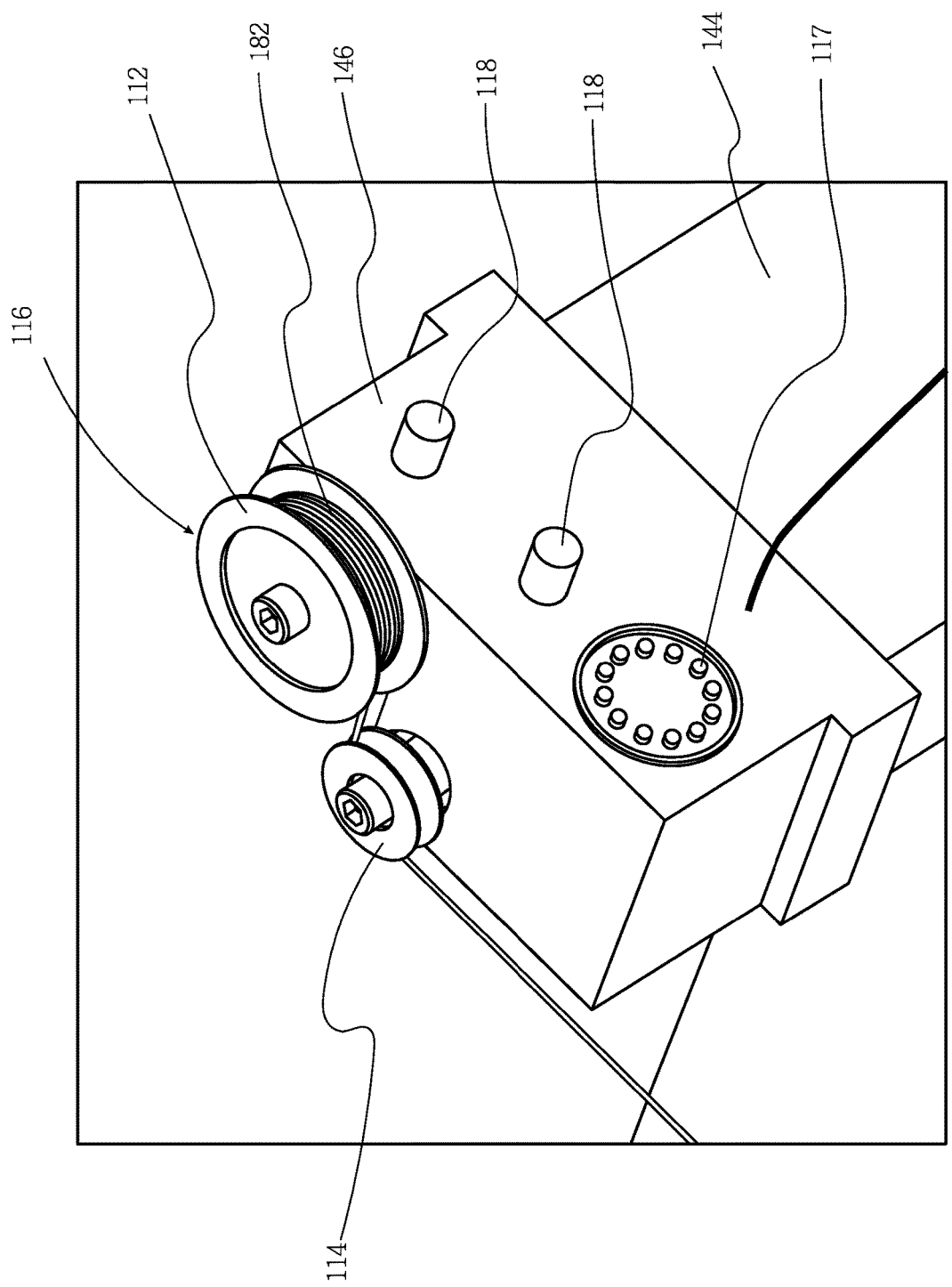
FIG. 4 is an enlarged view of some elements of the optical fiber winding machine.
Figure 5:
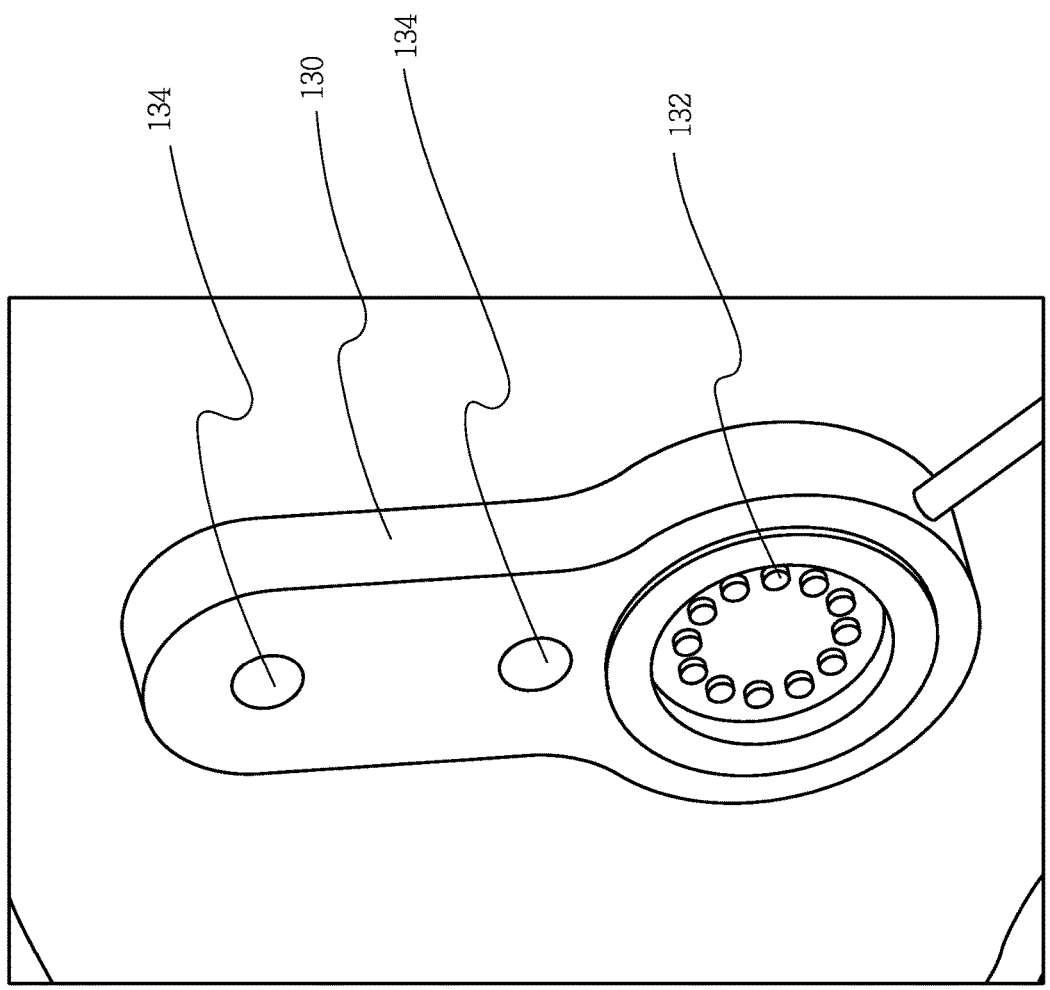
FIG. 5 is an enlarged view of some elements of the optical fiber winding machine.

FIG. 4 is an enlarged view of some elements of the optical fiber winding machine 100, wherein the elements adjacent to the first movable portion 146 are mainly shown. In some embodiments, the first electrical connecting portion 117 and at least one (e.g. two) first positioning element 118 may be disposed on the first movable portion 146. FIG. 5 is an enlarged view of some elements of the optical fiber winding machine 100, wherein the elements adjacent to the first docking element 130 are mainly shown. The first electrical connection module 132 and at least one (e.g. two) first positioning portion 134 may be disposed on the first docking element 130. The first electrical connecting portion 117 may correspond to the first electrical connection module 132 to provide power from the first docking element 130 to the first tension sensing module 114 on the first movable portion 146. For example, the first electrical connection module 132 may be disposed on the first output shaft 124 and electrically connected to the control module 170. The first positioning element 118 may correspond to the first positioning portion 134 to define the relative position between the first movable portion 146 and the first docking element 130. The first electrical connecting portion 117 and the first electrical connection module 132 may be corresponding probes, pin headers, electrical connectors, spring connectors or other devices or modules with electrical connection function.

In some embodiments, the first electrical connection module 132 may include a slip ring structure, because the slip ring structure will not cause wire winding or signal interruption due to the rotation of the first output shaft 124, so when the first movable portion 146 is docked to the first docking element 130, the first electrical connection module 132 can receive the power and control signals transmitted by the control module 170. At this moment, the second tension sensing module 214 is disposed on the second moving assembly 240, so the second tension sensing module 214 is also electrically connected to the control module 170 for receiving power and control signals. Therefore, when the first layer 401 is wound, the first tension sensing module 114 may detect a first tension of the first optical fiber segment 182, and the second tension sensing module 214 may detect a second tension of the second optical fiber segment 184. Similarly, the implementation principles of the second tension sensing module 214 and the second electrical connection module 232 are also identical. Therefore, the optical fiber winding machine in some embodiments of the present disclosure can solve the problem of full-time tension sensing that the traditional optical fiber winding machine cannot perform. It should be noted that when the number of the first electrical connection modules 132 is more than one, as shown in FIG. 3A, each of the first electrical connection module 132 may be electrically connected to a relay connector (similar to extension cord), and then connected to the control module 170 through the relay connector, but it is not limited thereto. Each of the first electrical connection modules 132 is also electrically connected to the control module 170.

Figure 6A:
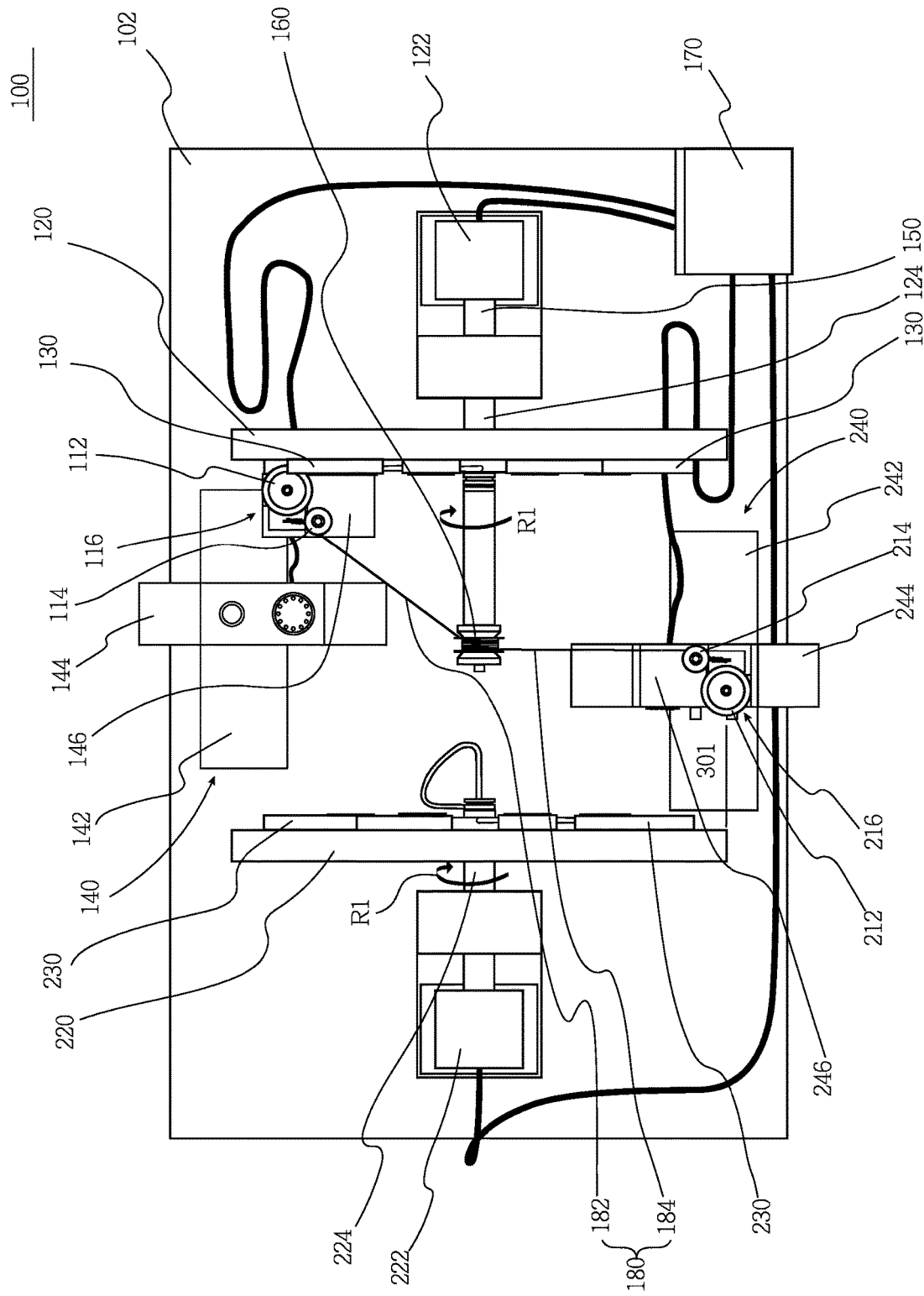
FIG. 6A is a schematic view during the operation of the optical fiber winding machine.
Figure 6B:
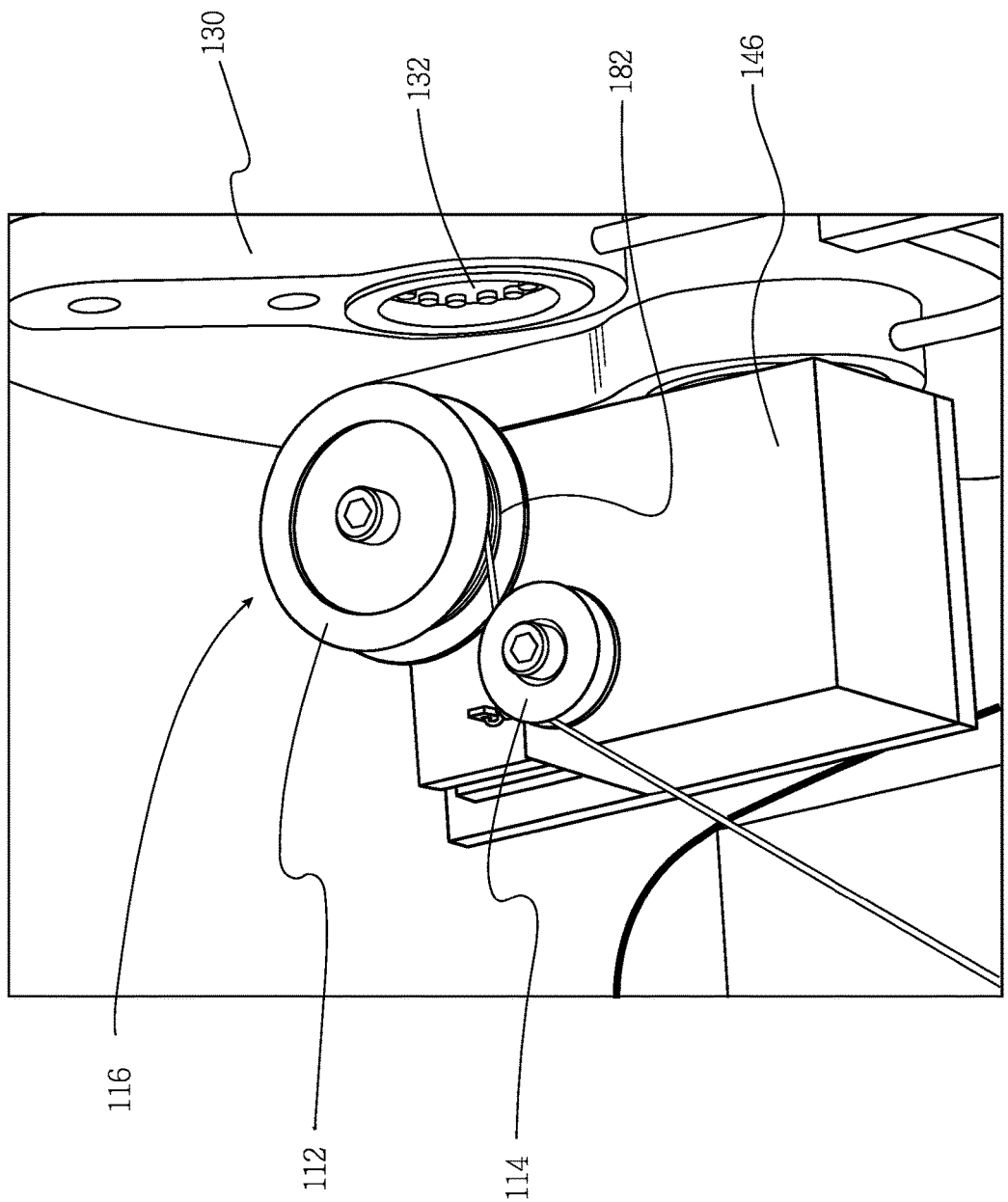
FIG. 6B is an enlarged view of the first docking element and the first movable portion in FIG. 6A.

FIG. 6A is a schematic view during the operation of the optical fiber winding machine 100. FIG. 6B is an enlarged view of the first docking element 130 and the first movable portion 146 in FIG. 6A. As shown in FIG. 6A and FIG. 6B, in actual operation, the control module 170 may control the movement of the first moving assembly 140, such as moving the first translational moving portion 144, the first movable portion 146, and the first wire storage ring 112, the first taking and releasing servo motor 116, and the first tension sensing module 114 disposed thereon toward the first revolution plate 120 relative to the first fixed portion 142, so the first translational moving portion 144, the first movable portion 146, the first wire storage ring 112, the first taking and releasing servo motor 116, and the first tension sensing module 114 disposed thereon may dock to the first docking element 130 on the first revolution plate 120 through the first positioning element 118 and the first positioning portion 134. Afterwards, the control module 170 controls the first movable portion 146 and the first wire storage ring 112, the first taking and releasing servo motor 116, and the first tension sensing module 114 disposed thereon to detach from the first translational moving portion 144. The control module 170 also controls the second moving assembly 240 to move toward the first revolution plate 120. At this moment, the optical fiber 180 is at a side of the optical fiber winding ring 160 adjacent to the first revolution plate 120.

The control module 170 then controls the first revolution plate 120 and the revolution plate 220 to rotate in the first rotation direction 81. Since the first movable portion 146 is docked on the first docking element 130 on the first revolution plate 120, the first wire storage ring 112 and the first revolution plate 120 would rotate together. The second wire storage ring 212 is disposed on the second moving assembly 240, so the second wire storage ring 212 would not rotate with the first revolution plate 120. With the rotation of the optical fiber winding ring 160, the second optical fiber segment 184 on the second wire storage ring 212 will start winding on the optical fiber winding ring 160.

Figure 7B:
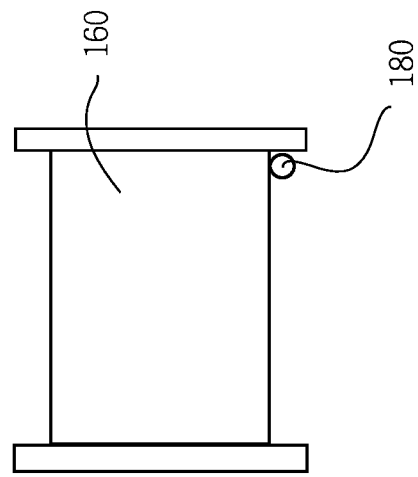
FIG. 7A and FIG. 7B are schematic views viewed in different directions when the optical fiber is just wound on the optical fiber winding ring.
Figure 7A:
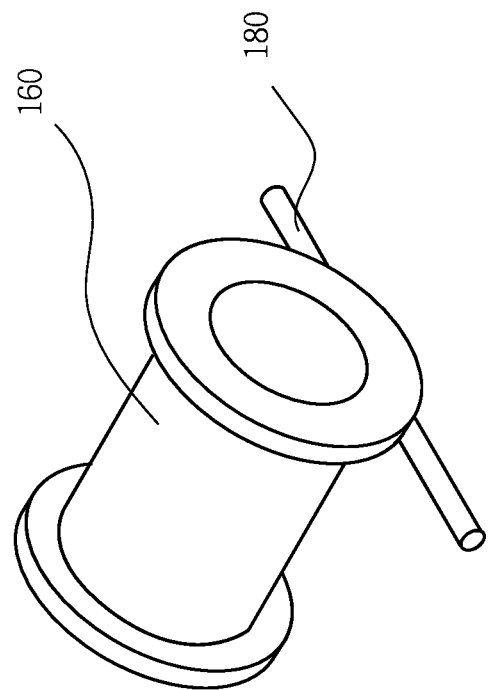
Figure 7D:
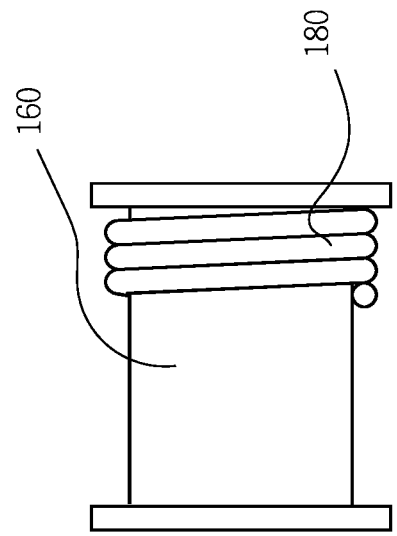
FIG. 7C and FIG. 7D are schematic views viewed in different directions when the optical fiber is wound on the optical fiber winding ring for several turns.
Figure 7C:
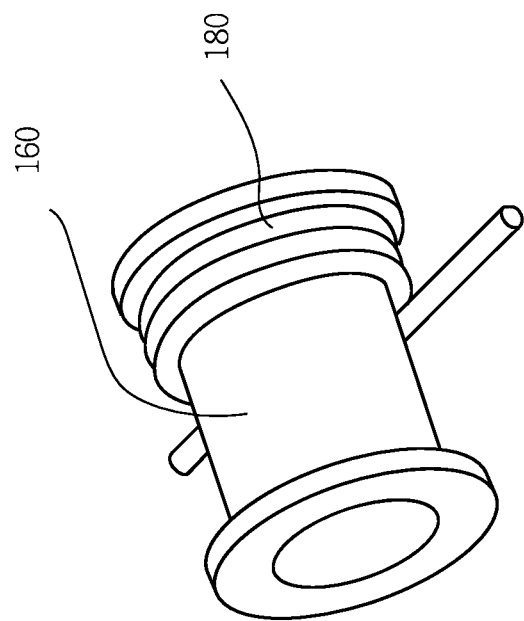

For example, FIG. 7A and FIG. 7B are schematic views viewed in different directions when the optical fiber 180 is just wound on the optical fiber winding ring 160, and FIG. 7C and FIG. 7D are schematic views viewed in different directions when the optical fiber 180 is wound on the optical fiber winding ring 160 for several turns. When the second optical fiber segment 184 winds on the optical fiber winding ring 160 for one turn, the control module 170 will control the second translational movement portion 244 and the second movable portion 246 of the second moving assembly 240 to move toward the revolution plate 220 in a moving direction 301 for a specific distance (e.g. the diameter of the optical fiber 180), so the second optical fiber segment 184 will wind on the optical fiber winding ring 160 along a spiral path.

When the second tension sensing module 214 detects that the second tension of the second optical fiber segment 184 is greater than an upper limit, the control module 170 will control the second taking and releasing servo motor 216 to release the optical fiber 180 faster. When the second tension sensing module 214 detects that the second tension of the second optical fiber segment 184 is less than a lower limit, the control module 170 will control the second taking and releasing servo motor 216 to release the optical fiber 180 slower. As a result, the problem of optical fiber breakage or uneven winding caused by excessive or small tension may be avoided.

Figure 7E:
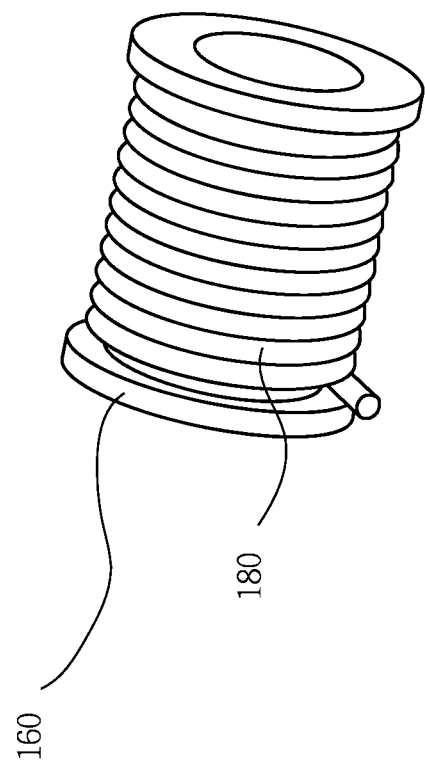
FIG. 7E and FIG. 7F are schematic views viewed in different directions when the optical fiber is wound on the optical fiber winding ring to get the first layer.
Figure 7F:
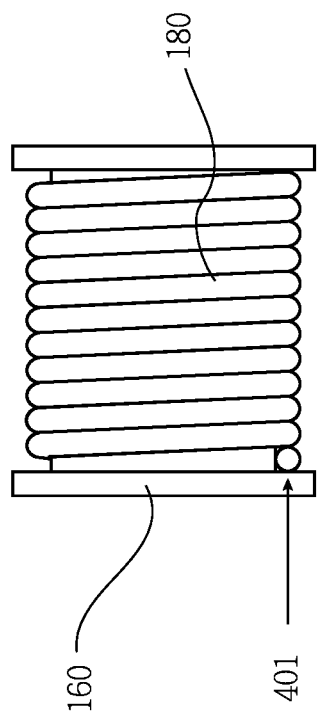

FIG. 7E and FIG. 7F are schematic views viewed in different directions when the optical fiber 180 is wound on the optical fiber winding ring 160 to get a first layer 401. After the first layer 401 is wound, the control module 170 will control the second moving assembly 240 to move the second wire storage ring 212, the second taking and releasing servo motor 216, the second tension sensing module 214 toward the revolution plate 220, so that the second wire storage ring 212, the second taking and releasing servo motor 216, and the second tension sensing module 214 dock to the second docking element 230 on the revolution plate 220.

Figure 8A:
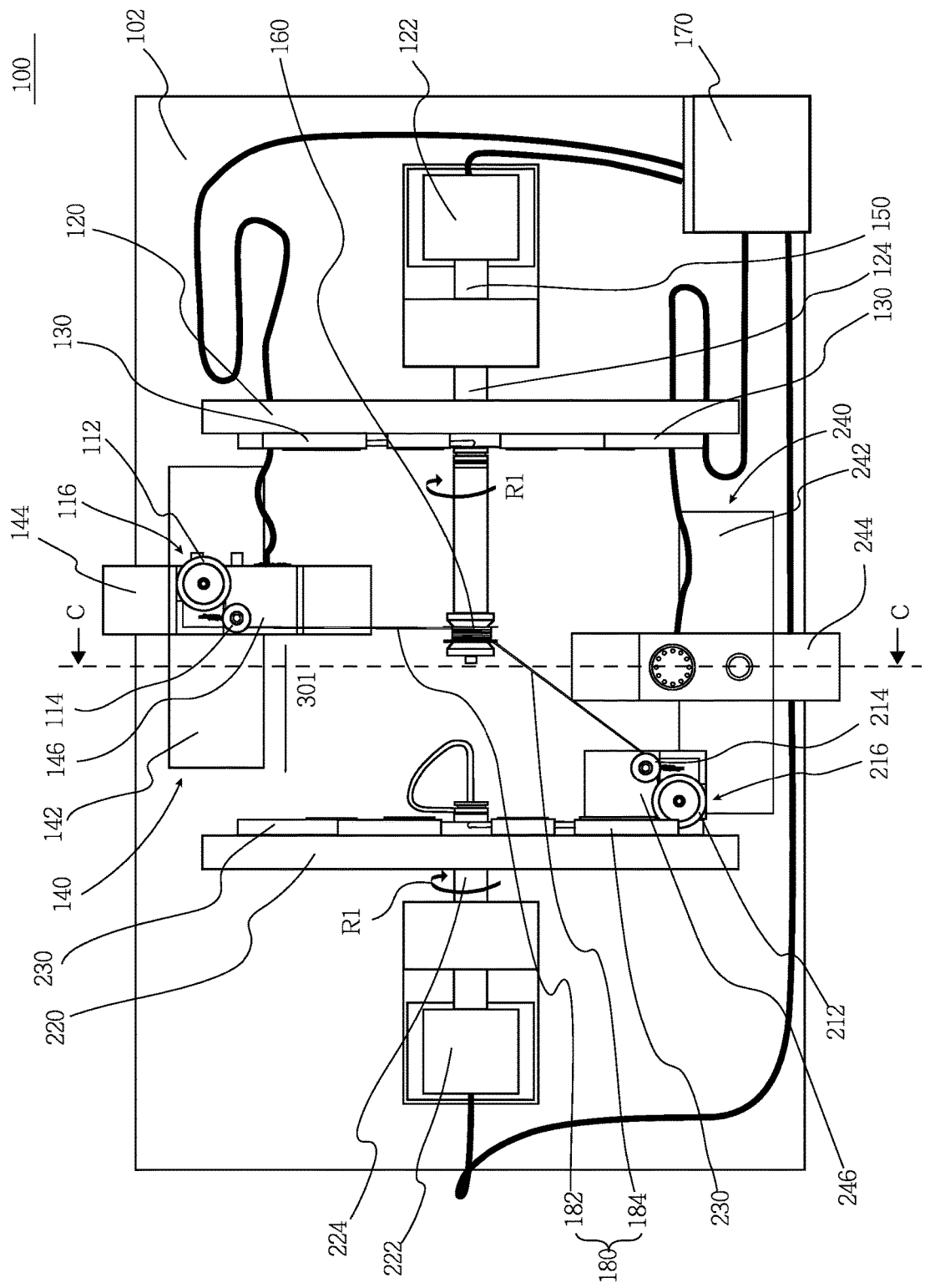
FIG. 8A is a schematic view during the operation of the optical fiber winding machine.
Figure 8B:
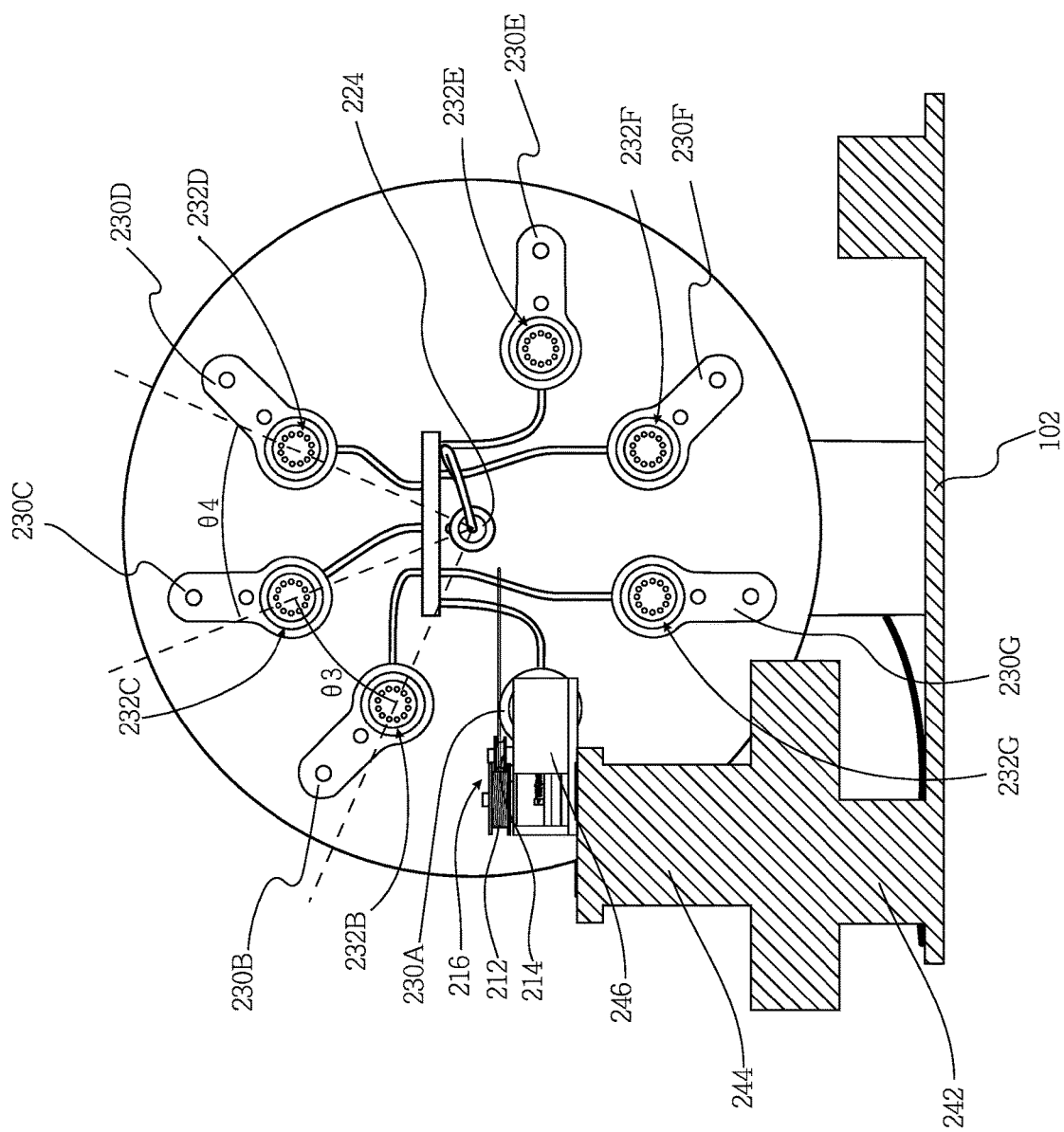
FIG. 8B is a schematic view showing some elements of the optical fiber winding machine in the condition of FIG. 8A.

FIG. 8A is a schematic view during the operation of the optical fiber winding machine 100. FIG. 8B is a schematic view showing some elements of the optical fiber winding machine 100 in the condition of FIG. 8A, wherein the revolution plate 220 and adjacent elements are mainly shown. As shown in FIG. 8A, the control module 170 controls the first translational moving portion 144 to move toward the first revolution plate 120 for the first movable portion 146 being disposed thereon, and then the first movable portion 146 is moved to detach from the first docking element 130.

Figure 9A:
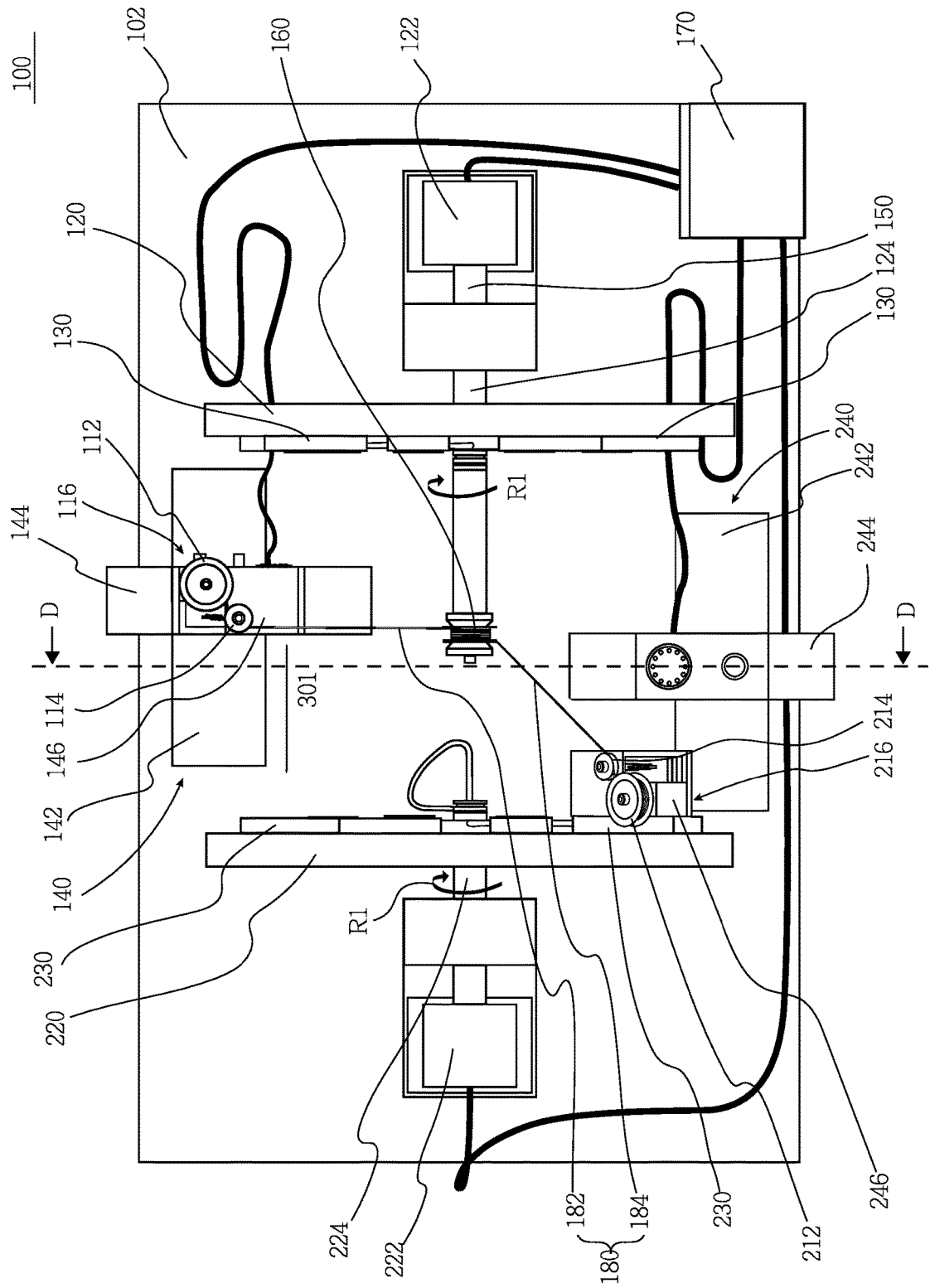
FIG. 9A is a schematic view during the operation of the optical fiber winding machine.
Figure 9B:
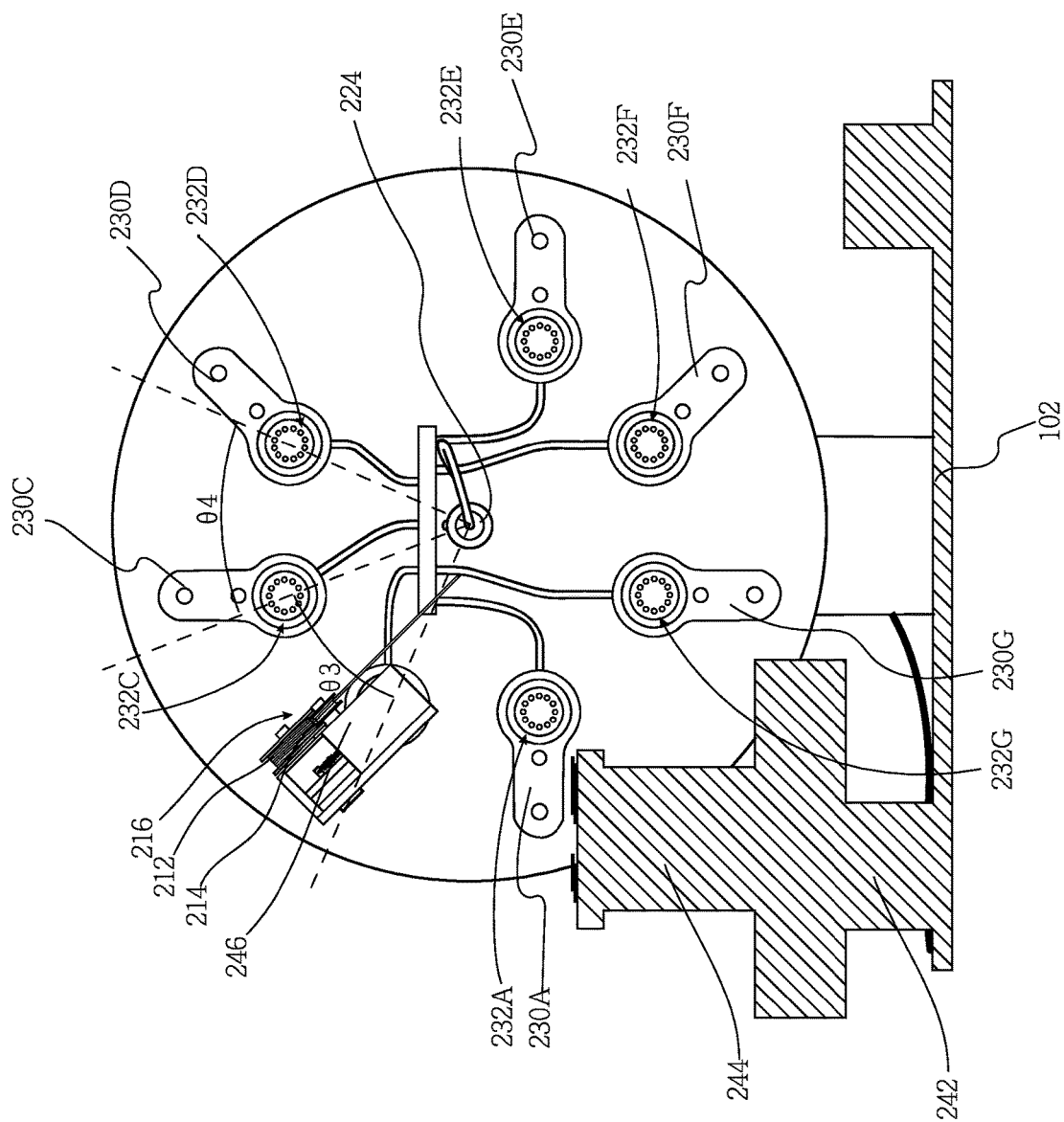
FIG. 9B is a schematic view showing some elements of the optical fiber winding machine in the condition of FIG. 9A.

FIG. 9A is a schematic view during the operation of the optical fiber winding machine 100. FIG. 9B is a schematic view showing some elements of the optical fiber winding machine 100 in the condition of FIG. 9A. Afterwards, the control module 170 controls the first revolution plate 120 and the revolution plate 220 to rotate in the first rotation direction R1, as shown in FIG. 9A and FIG. 9B. Since the second wire storage ring 212 docks on the second docking element 230 on the revolution plate 220, the second wire storage ring 212 and the revolution plate 220 rotate together. The first wire storage ring 112 is disposed on the first moving assembly 140, so the first wire storage ring 112 will not rotate with the revolution plate 220. As the optical fiber winding ring 160 keep rotating, the first optical fiber segment 182 on the first wire storage ring 112 will start winding on the optical fiber winding ring 160.

Figure 10B:
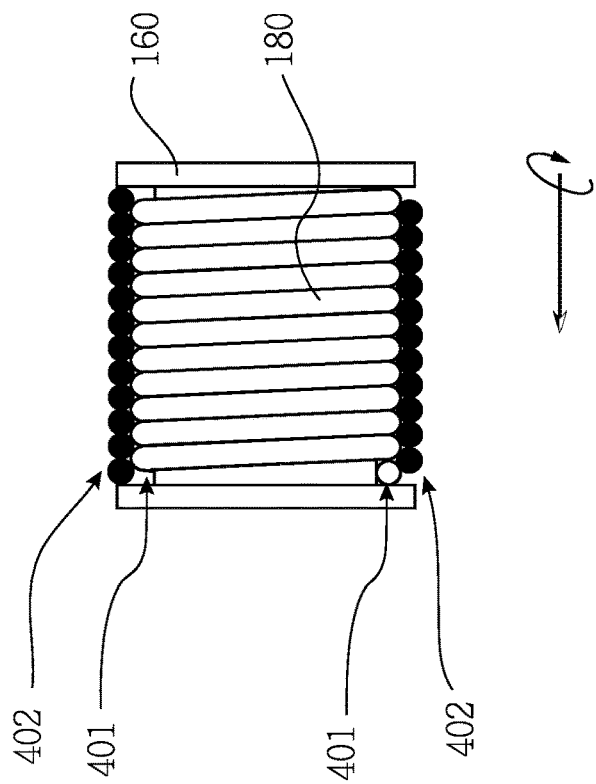
FIG. 10A and FIG. 10B are schematic views viewed in different directions when the optical fiber is wound on the optical fiber winding ring to get the second layer.
Figure 10A:
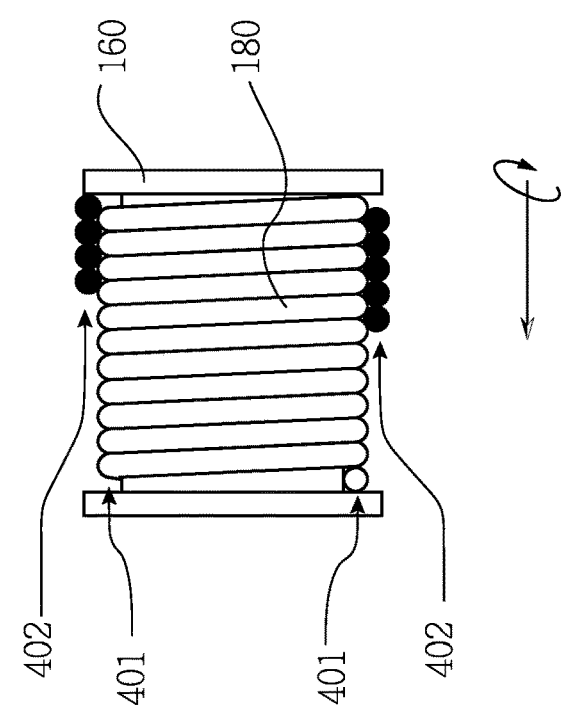

For example, FIG. 10A and FIG. 10B are schematic views viewed in different directions when the optical fiber 180 is wound on the optical fiber winding ring 160 to get a second layer 402. When the first optical fiber segment 182 winds on the optical fiber winding ring 160 for one turn, the control module 170 will control the first moving assembly 140 to move toward the revolution plate 220 in the moving direction 301 for a specific distance (e.g. the diameter of the optical fiber 180), so the first optical fiber segment 182 will wind on the optical fiber winding ring 160 along a spiral path on the optical fiber winding ring 160 until the second layer 402 is completely wound.

It should be noted that as shown in FIG. 7A to FIG. 7F, FIG. 10A, and FIG. 10B, when the first layer 401 and the second layer 402 are wound, the optical fiber 180 is wound in an identical direction, such as winding from right to left shown in the figures.

In some embodiments, when the first tension sensing module 114 detects that the second tension of the first optical fiber segment 182 is greater than an upper limit, the control module 170 will control the first taking and releasing servo motor 116 to release the optical fiber 180 faster. When the first tension sensing module 114 detects that the second tension of the first optical fiber segment 182 is less than a lower limit, the control module 170 will control the first taking and releasing servo motor 116 to release the optical fiber 180 slower. As a result, the problem of optical fiber breakage or uneven winding caused by excessive or small tension may be avoided.

Figure 11:
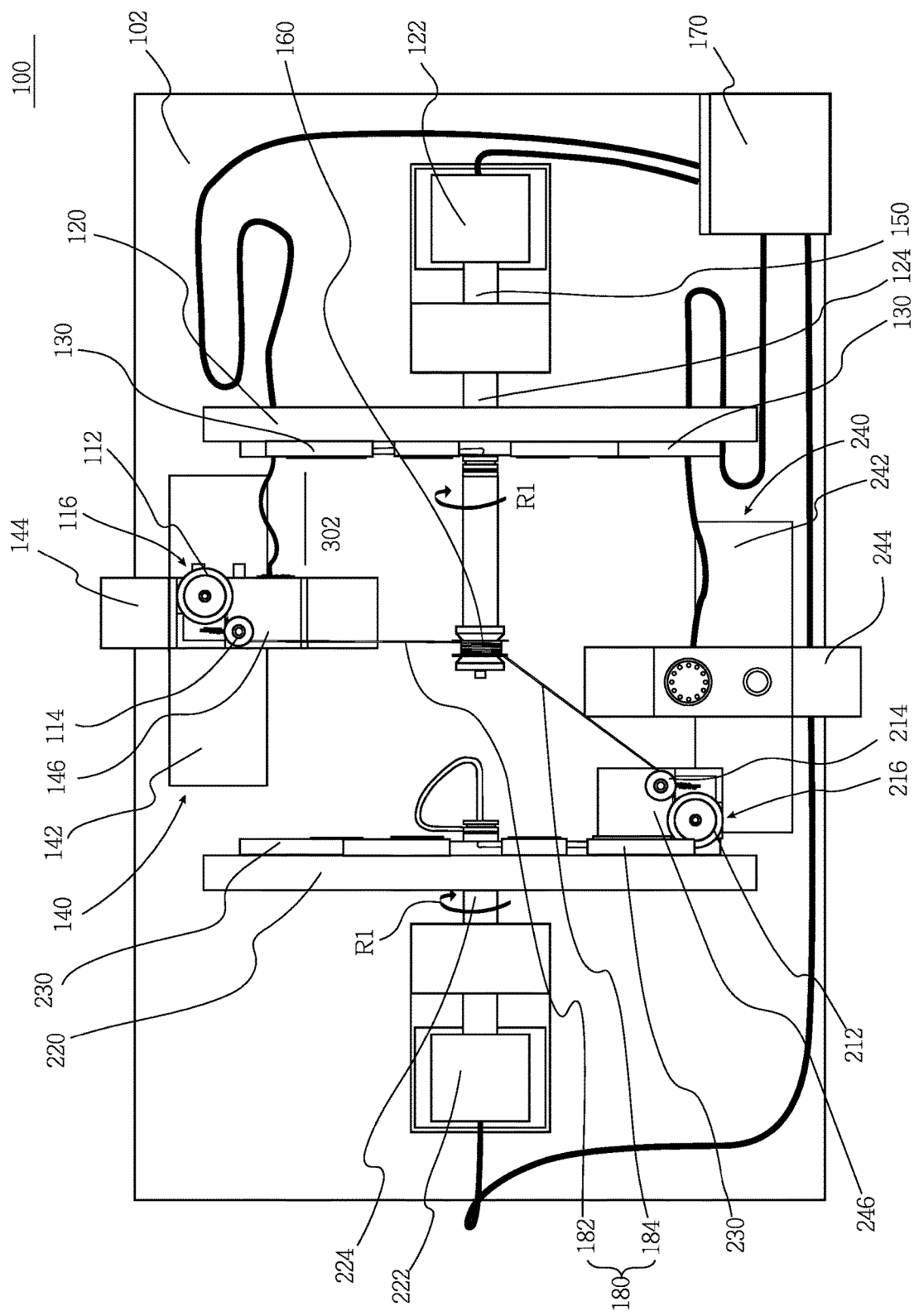
FIG. 11 is a schematic view during the operation of the optical fiber winding machine.

FIG. 11 is a schematic view during the operation of the optical fiber winding machine 100. FIG. 12A and FIG. 12B are schematic views viewed in different directions when the optical fiber 180 is wound on the optical fiber winding ring 160 to get a third layer 403. As shown in FIG. 11, FIG. 12A, and FIG. 12B, after the second layer 402 is completely wound, the control module 170 will control the first moving assembly 140 to move toward the first revolution plate 120 in a moving direction 302 to allow the first optical fiber segment 182 winding on the optical fiber winding ring 160 in another spiral path, so the third layer 403 may be formed.

Figure 13:
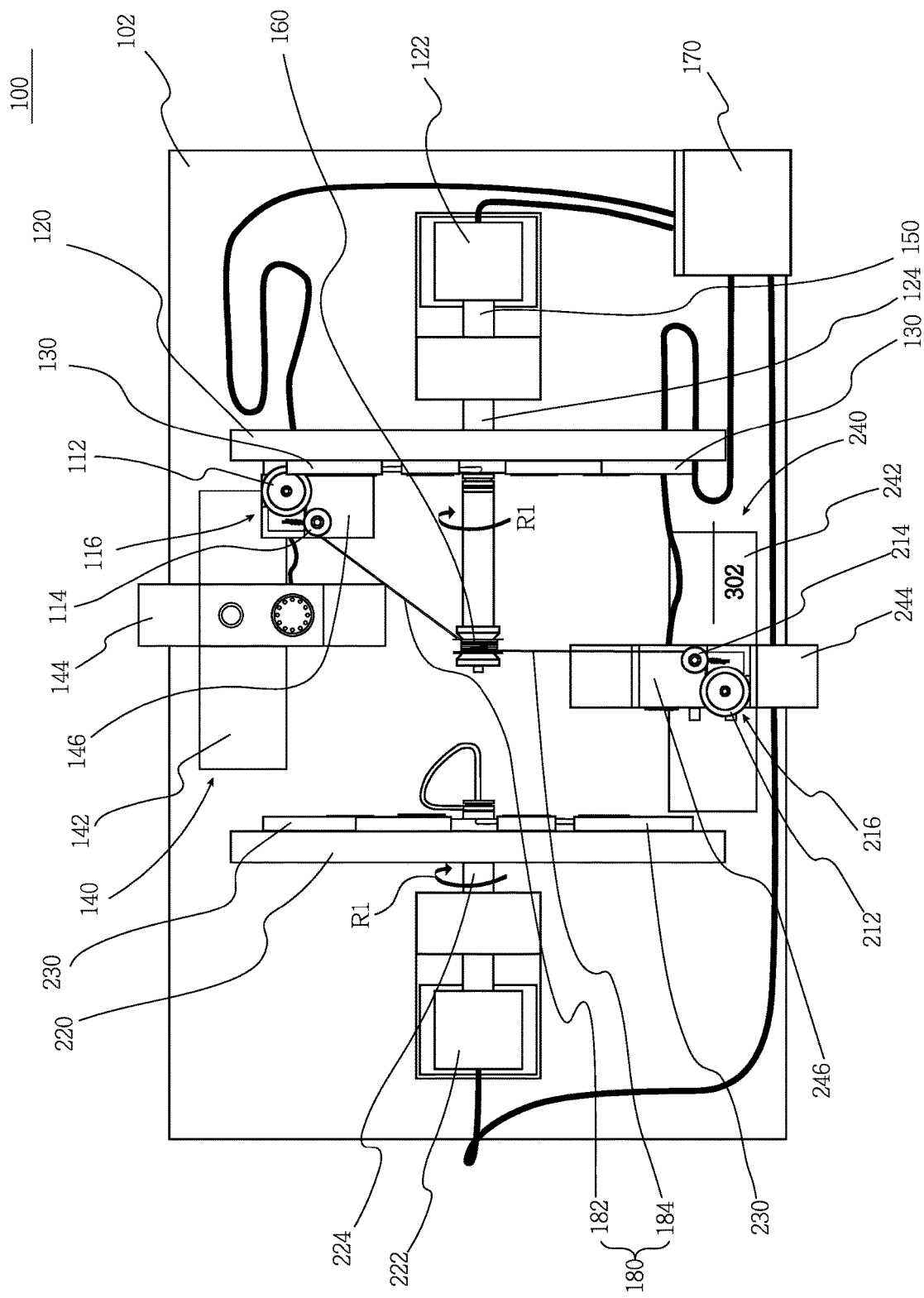
FIG. 13 is a schematic view during the operation of the optical fiber winding machine.

FIG. 13 is a schematic view during the operation of the optical fiber winding machine 100. Afterward, as shown in FIG. 13, the control module 170 moved the first moving assembly 140 in the moving direction 302, and the first wire storage ring 112, the first taking and releasing servo motor 116, and the first tension sensing module 114 are moved toward the first revolution plate 120 in the moving direction 302. Therefore, the first wire storage ring 112, the first taking and releasing servo motor 116, and the first tension sensing module 114 dock to the first docking element 130 on the first revolution plate 120. The control module 170 then controls the first movable portion 146 and the first wire storage ring 112, the first taking and releasing servo motor 116, and the first tension sensing module 114 disposed on the first movable portion 146 to detach from the first fixed portion 142 and the first translational moving portion 144. The control module 170 also controls the second moving assembly 240 to move toward the first revolution plate 120, and controls the second movable portion 246 and the second wire storage ring 212, the second taking and releasing servo motor 216, and the second tension sensing module 214 disposed on the second movable portion 246 detaching from the second docking element 230 on the revolution plate 220.

Figure 14B:
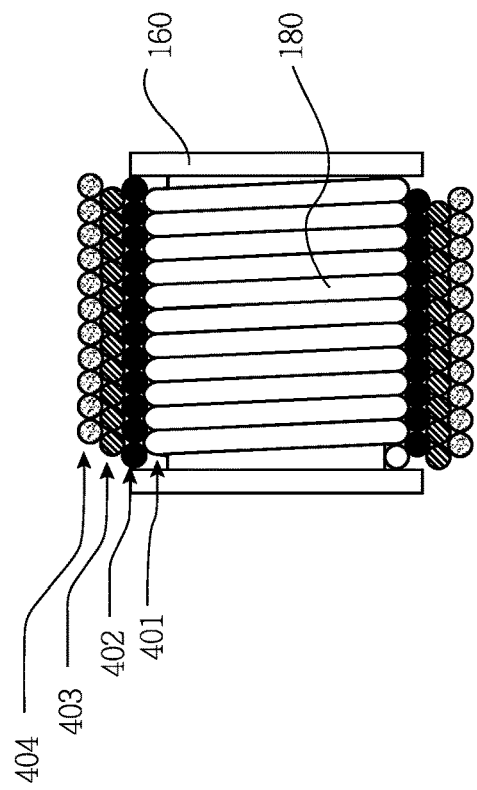
FIG. 14A and FIG. 14B are schematic views viewed in different directions when the optical fiber is wound on the optical fiber winding ring to get the fourth layer.
Figure 14A:
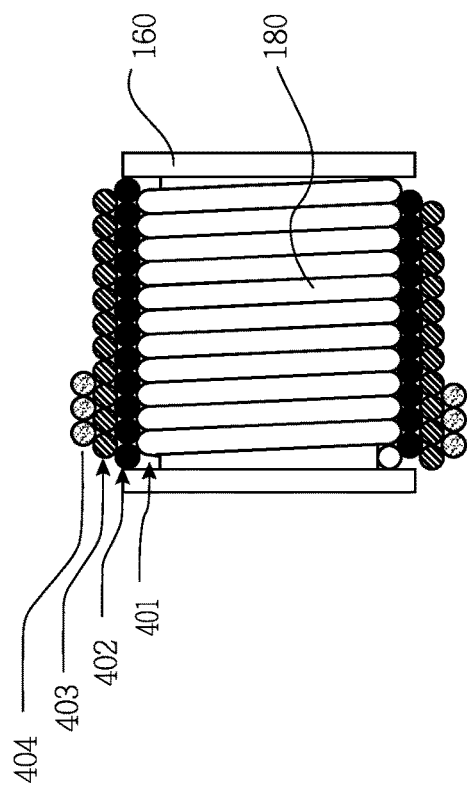

In some embodiments, the control module 170 controls the first revolution plate 120 and the revolution plate 220 to rotate in the first rotation direction 81. FIG. 14A and FIG. 14B are schematic views viewed in different directions when the optical fiber 180 is wound on the optical fiber winding ring 160 to get a fourth layer 404. The second optical fiber segment 184 on the second wire storage ring 212 starts winding on the optical fiber winding ring 160 at this moment. It should be noted that each turn the second optical fiber segment 184 rotates, the control module 170 controls the second moving assembly 240 to move toward the first revolution plate 120 with a specific distance, thereby completing the winding of the fourth layer 404.

It should be noted that, as shown in FIG. 12A, FIG. 12B, FIG. 14A, and FIG. 14B, when the third layer 403 and the fourth layer 404 are wound, the winding directions of the optical fiber 180 are identical, such as from left to right shown in the figures. In addition, this winding direction is opposite to the aforementioned winding direction of the first layer 401 and the second layer 402 (e.g., from right to left). It should be noted that the dimensions of the elements in the figure are only schematic for clearly revealing the technical features of the present invention. In practice, the height of the two side walls of the optical fiber winding ring 160 may be higher than the sum of the optical fiber diameters of all wound layers, so that the optical fiber 180 may be wound on the optical fiber winding ring 160.

By analogy, the following fifth to eighth layers are wound in the same manner as the first layer 401 to the fourth layer 404, so no further description is given. In summary, when the first wire storage ring 112 docks to the first docking element 130 on the first revolution plate 120, and the second wire storage ring 212 does not dock to the second docking element 230 on the revolution plate 220, the second optical fiber segment 184 on the second wire storage ring 212 will wind on the optical fiber winding ring 160 when the rotation starts. When the second wire storage ring 212 docks to the second docking element 230 on the revolution plate 220, and the first wire storage ring 112 does not dock to the first docking element 130 on the first revolution plate 120, the first optical fiber segment 182 on the first wire storage ring 112 will wind on the optical fiber winding ring 160 when the rotation starts.

When the optical fiber 180 is wound on the optical fiber winding ring 160, an optical fiber ring in an optical fiber gyroscope is formed.

In summary, an optical fiber winding machine with full-time tension control function is provided in some embodiments of the present disclosure. The optical fiber winding machine also allows the optical fiber being wound on the optical fiber winding ring for a specific length or turns. Since the two tension sensing modules of the optical fiber winding machine detect the tension fill-time, the routing speed may be increased from 30 rpm-60 rpm (speed of traditional optical fiber winding machine) to 70 rpm-200 rpm. In other words, the rotational speed increases by about 16.67% to 566.67%. Because the rotational speed is proportional to the production capacity and inversely proportional to the working hours, the optical fiber winding machine of the present disclosure can increase the output by about 16.67% to 566.67% compared with the prior art.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

The invention claimed is:

1. An optical fiber winding machine with full-time tension control function, comprising:
   a first wire storage ring, wherein a first optical fiber segment of an optical fiber is wound on the first wire storage ring;
   a first tension sensing module disposed corresponding to the first wire storage ring, and used for detecting a first tension of the first optical fiber segment;
   a first revolution plate;

a first rotary servo motor connected to the first revolution plate and comprising a first output shaft, wherein the first rotary servo motor is used for driving the first revolution plate to rotate in a first rotational direction;

a first moving assembly connected to the first revolution plate and is operative to move the first wire storage ring;

a set of first docking elements disposed on the first revolution plate;

a set of first electrical connection modules disposed corresponding to the set of first docking elements and the first output shaft;

a second wire storage ring disposed opposite to the first wire storage ring, wherein a second optical fiber segment of the optical fiber is wound on the second wire storage ring, and the first optical fiber segment and the second optical fiber segment are connected to each other;

a second tension sensing module corresponding to the second wire storage ring, and is used for detecting a second tension of the second optical fiber segment;

a second revolution plate disposed corresponding to the first revolution plate;

a second rotary servo motor connected to the second revolution plate and comprising a second output shaft, wherein the first output shaft and the second output shaft are coaxial, and the second rotary servo motor is used for driving the second revolution plate to rotate in the first rotational direction;

a second moving assembly connected to the second revolution plate and is operative to move the second wire storage ring;

a set of second docking elements disposed on the second revolution plate and corresponding to the set of first docking elements;

a set of second electrical connection modules disposed corresponding to the set of second docking elements and the second output shaft;

a rotating shaft connected to the first output shaft and driven by the first rotary servo motor to rotate in the first rotation direction;

an optical fiber winding ring sleeved on the rotating shaft and being operative to rotate in the first rotational direction, wherein the first optical fiber segment and the second optical fiber segment are wound on the optical fiber winding ring, and the optical fiber winding ring and the optical fiber wound on the optical fiber winding ring form an optical fiber ring; and a control module electrically connected to the first rotary servo motor, the second rotary servo motor, the first moving assembly, the second moving assembly, the set of first electrical connection modules, and the set of second electrical connection modules and generating a first driving signal, a second driving signal, a first sensing signal, and a second sensing signal for controlling the first rotary servo motor and the second rotary servo motor rotating in the first rotational direction, and controlling the first tension sensing module and the second tension sensing module sensing the first tension and the second tension, respectively;

wherein when the first wire storage ring connects to the set of first docking elements and leaves the first moving assembly, the second wire storage ring is positioned at the second moving assembly, the first tension sensing module receives the first sensing signal through the first electrical connection modules, and the second tension sensing module is electrically connected to the control module to receive the second sensing signal;

when the second wire storage ring connects to the set of second docking elements and leaves the second moving assembly, the first wire storage ring is positioned at the first moving assembly, the second tension sensing module receives the second sensing signal by the second electrical connection module, the first tension sensing module is electrically connected to the control module to receive the first sensing signal, so the first tension sensing module and the second tension sensing module detect the first tension and the second tension full-time when the first revolution plate and the second revolution plate are rotating.

2. The optical fiber winding machine with full-time tension control function as claimed in claim 1, wherein the set of first electrical connection modules and the set of second electrical connection modules are slip rings.

3. The optical fiber winding machine with full-time tension control function as claimed in claim 1, further comprising a first taking and releasing servo motor disposed corresponding to the first wire storage ring, used for being operative to increasing a first output rotational speed when the first tension sensing module detecting the first tension being greater than a tension upper limit; and being operative to decreasing the first output rotational speed when the first tension sensing module detecting the first tension being lower than a tension lower limit.

4. The optical fiber winding machine with full-time tension control function as claimed in claim 1, further comprising a second taking and releasing servo motor disposed corresponding to the second wire storage ring, used for being operative to increasing a second output rotational speed when the second tension sensing module detecting the second tension being greater than a tension upper limit; and being operative to decreasing the second output rotational speed when the second tension sensing module detecting the second tension being lower than a tension lower limit.

5. The optical fiber winding machine with full-time tension control function as claimed in claim 1, wherein the set of first docking elements comprise a plurality of first docking elements disposed on the first revolution plate.

6. The optical fiber winding machine with full-time tension control function as claimed in claim 5, wherein a plurality of first angles are formed by any two of the adjacent first docking elements, and the first angles are identical.

7. The optical fiber winding machine with full-time tension control function as claimed in claim 5, a plurality of first angles are formed by any two of the adjacent first docking elements, and at least one of the first angles is different from the rest of the first angles.

8. The optical fiber winding machine with full-time tension control function as claimed in claim 1, wherein the set of second docking elements comprise a plurality of second docking elements disposed on the second revolution plate.

9. The optical fiber winding machine with full-time tension control function as claimed in claim 8, wherein a plurality of second angles are formed by any two of the adjacent second docking elements, and the second angles are identical.

10. The optical fiber winding machine with full-time tension control function as claimed in claim 8, a plurality of second angles are formed by any two of the adjacent second docking elements, and at least one of the second angles is different from the rest of the second angles.

* * * * *